(12) United States Patent
Zhu et al.

(10) Patent No.: US 10,009,779 B2
(45) Date of Patent: Jun. 26, 2018

(54) METHOD FOR IMPROVING NETWORK PERFORMANCE, USER EQUIPMENT AND STORAGE MEDIUM

(71) Applicant: Sanechips Technology Co., Ltd., Shenzhen, Guangdong (CN)

(72) Inventors: Guangqing Zhu, Shenzhen (CN); Xiaolong Ran, Shenzhen (CN); Lei Pan, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 0 days. days.

(21) Appl. No.: 15/327,511

(22) PCT Filed: Nov. 14, 2014

(86) PCT No.: PCT/CN2014/091157
§ 371 (c)(1),
(2) Date: Jan. 19, 2017

(87) PCT Pub. No.: WO2015/117449
PCT Pub. Date: Aug. 13, 2015

(65) Prior Publication Data
US 2017/0150375 A1    May 25, 2017

(30) Foreign Application Priority Data
Jul. 21, 2014  (CN) .......................... 2014 1 0348445

(51) Int. Cl.
*H04W 24/02* (2009.01)
*H04W 72/08* (2009.01)
(Continued)

(52) U.S. Cl.
CPC ............. *H04W 24/02* (2013.01); *H04L 5/006* (2013.01); *H04L 5/0057* (2013.01);
(Continued)

(58) Field of Classification Search
None
See application file for complete search history.

(56) References Cited

U.S. PATENT DOCUMENTS

| 8,644,182 B2 * | 2/2014 | Seo | ........................ | H04L 1/0027 |
| | | | | 370/252 |
| 9,019,926 B2 * | 4/2015 | Yi | ......................... | H04W 72/10 |
| | | | | 370/252 |

(Continued)

FOREIGN PATENT DOCUMENTS

| CN | 102300329 A | 12/2011 |
| CN | 103023617 A | 4/2013 |

(Continued)

OTHER PUBLICATIONS

International Search Report in international application No. PCT/CN2014/091157, dated May 7, 2015, 2 pgs.
(Continued)

*Primary Examiner* — Candal Elpenord
(74) *Attorney, Agent, or Firm* — Cooper Legal Grop, LLC

(57) ABSTRACT

Disclosed is a method for improving network performance, comprising: according to the signal-to-interference-plus-noise ratio (SINR) of high speed physical downlink shared channels (HS-PDSCHs) on two or more than two carriers, which is obtained by way of measurement, respectively acquiring, by a user equipment (UE), a channel quality indicator (CQI) of the HS-PDSCH on each carrier; when it is determined that the difference between the SINR of the HS-PDSCH on one or more than one carrier in all the carriers and the maximum SINR of the HS-PDSCHs on all the carriers is greater than a first threshold value, updating the CQI of the HS-PDSCH on the one or more than one carrier; and reporting the CQIs of the HS-PDSCHs on all the carriers to a network side, the CQIs being used for the
(Continued)

network side to schedule the UE. Also disclosed at the same time are a UE and a storage medium.

19 Claims, 3 Drawing Sheets

(51) Int. Cl.
  *H04L 5/00* (2006.01)
  *H04W 24/08* (2009.01)
  *H04W 24/10* (2009.01)
  *H04W 88/02* (2009.01)
(52) U.S. Cl.
  CPC ........... *H04W 24/08* (2013.01); *H04W 24/10* (2013.01); *H04W 72/085* (2013.01); *H04W 88/02* (2013.01)

(56) References Cited

U.S. PATENT DOCUMENTS

| | | |
|---|---|---|
| 2008/0253336 A1 | 10/2008 | Parkvall |
| 2008/0299985 A1* | 12/2008 | Yang ............... H04W 28/20 455/452.2 |
| 2009/0257421 A1* | 10/2009 | Nakashima ......... H04L 27/2608 370/345 |
| 2009/0262653 A1 | 10/2009 | Toda |
| 2010/0067396 A1 | 3/2010 | Cui |
| 2010/0296462 A1 | 11/2010 | Taoka |
| 2011/0110337 A1* | 5/2011 | Grant ..................... H04B 1/707 370/335 |
| 2011/0158195 A1 | 6/2011 | Toda |
| 2011/0199933 A1* | 8/2011 | Liu ..................... H04W 72/085 370/252 |
| 2012/0076103 A1* | 3/2012 | Dai .................... H04W 72/1289 370/329 |
| 2013/0195008 A1* | 8/2013 | Pelletier ............... H04B 7/0417 370/328 |
| 2013/0301623 A1 | 11/2013 | Toda et al. |
| 2014/0293817 A1 | 10/2014 | Parkvall et al. |
| 2014/0293818 A1 | 10/2014 | Sesia et al. |
| 2016/0037369 A1 | 2/2016 | Parkvall et al. |
| 2016/0352406 A1 | 12/2016 | Toda et al. |

FOREIGN PATENT DOCUMENTS

| | | |
|---|---|---|
| CN | 103167616 A | 6/2013 |
| JP | 2005057710 A | 3/2005 |
| JP | 2007228342 A | 9/2007 |
| JP | 2012525081 A | 10/2012 |
| JP | 2013219507 A | 10/2013 |
| WO | 2007020995 A1 | 2/2007 |
| WO | 2013050307 A1 | 4/2013 |

OTHER PUBLICATIONS

English Translation of the Written Opinion of the International Search Authority in international application No. PCT/CN2014/091157, dated May 7, 2015, 5 pgs.

Supplementary European Search Report in European application No. 14881737.2, dated Jun. 8, 2017, 7 pgs.

* cited by examiner

METHOD FOR IMPROVING NETWORK PERFORMANCE, USER EQUIPMENT AND STORAGE MEDIUM

TECHNICAL FIELD

The present disclosure relates to communication data processing, and in particular to a method for improving network performance, User Equipment (UE), and a storage medium.

BACKGROUND

In a Wideband Code Division Multiple Access (WCDMA) network, as well as in a Time-Division-Synchronous Code Division Multiple Access (TD-SCDMA) network, when UE performs multicarrier High Speed Downlink Packet Access (HSDPA) in a connected state, a network side notifies, through a reconfiguring message, the UE to perform an HSDPA downlink data service simultaneously on multiple carriers. The UE computes Channel Quality Indicators (CQI) corresponding respectively to the carriers according to channel quality of High Speed Physical Downlink Shared Channels (HS-PDSCH) received on the carriers, and reports the computed CQIs to the network side. The network side selects, according to the CQIs reported by the UE, HSDPA parameters such as a Transmission Block (TB) size, a number of HS-PDSCH code channels, a modulation mode, power, etc., corresponding respectively to the carriers. The network side then schedules the UE according to priorities of the UE corresponding respectively to the carriers based on the selected HSDPA parameters.

The UE computes the CQIs corresponding respectively to the carriers separately. The network side separately selects TB sizes, numbers of HS-PDSCH code channels, modulation modes, and power corresponding respectively to the carriers. Channels propagating wirelessly on the carriers attenuate relatively independent of each other. The UE has different priorities on the carriers. Accordingly, power of HS-PDSCH data allocated to different carriers differs a lot. In an extreme case, in a sub-frame, all HS-PDSCH data in fifteen code channels on one carrier may be scheduled for the UE, while no HS-PDSCH data on another carrier is scheduled for the UE.

When the UE performs multicarrier HSDPA in the connected state, it is disadvantageous to have HS-PDSCH power values, allocated to different carriers, that differ a lot. In a first aspect, when HS-PDSCH power values allocated to different carriers differ a lot, Adjacent Channel Selectivity (ACS) among multiple working carriers is low, leading to blockage of, and interference to, a signal on a low-power carrier, reducing channel quality. In a second aspect, when a terminal separates a digital signal on a carrier, HS-PDSCH power values allocated to different carriers with big differences may impact performance of an Automatic Gain Control (AGC) loop algorithm, such that a baseband signal fails to stabilize within a proper range before entering an Analog-Digital Converter (ADC), leading to signal saturation on a high-power carrier and insufficient signal resolution on a low-power carrier. Due to impact of the first and the second aspects, the channel quality of the signal on a low-power carrier may keep worsening, which signal may even not be able to be resolved correctly after multiple Hybrid Automatic Repeat Request (HARQ) retransmissions, impacting Slide Window Processing (SWP) over a data packet at a Radio Link Control (RLC) layer and a Medium Access Control (MAC) layer in a protocol stack, causing HSDPA downlink data accumulation, reducing a downlink HSDPA rate, thereby worsening downlink receiving performance of an HSDPA network.

To reduce a difference between power values of HS-PDSCH data of a UE on two carriers, a priority of the UE on a low-power carrier has to be increased. A formula for computing a priority in an HSDPA scheduling algorithm goes as follows.

$$RelativePriotity = WeightofSPI*Rate*WeightofDelay/(1+HistoryFlux) \quad (1).$$

The WeightofSPI designates a fixed priority for scheduling a terminal configured by NodeB Application Part (NBAP) protocol signalling. The weightofDelay designates a delay weight for a Voice over Internet Protocol (VoIP) and a Circuit Switched (CS) Voice Service over High Speed Packet Access (HSPA), which is not a focus herein.

$$Rate = w1(CQI\_n)*TBSIZE(CQI\_n) \quad (2).$$

$$HistoryFlux(n) = HistoryFlux(n-1)*0.96 + TBSIZE1 + TBSIZE2 \quad (3).$$

The TBSIZE1 and the TBSIZE2 are TB sizes respectively for scheduling a double-connection HSDPA user on a primary carrier and a secondary carrier.

It may be seen that in order to increase a priority of the UE on a carrier, a CQI corresponding to the carrier as reported by the UE has to be increased.

SUMMARY

In view of this, embodiments herein provide a method for improving network performance, UE, and a storage medium, capable of improving downlink receiving performance of a multicarrier HSDPA network.

A technical solution herein may be implemented as follows.

According to an embodiment herein, a method for improving network performance includes: measuring, by User Equipment (UE), Signal to Interference plus Noise Ratios (SINR) of High Speed Physical Downlink Shared Channels (HS-PDSCH) on multiple carriers; acquiring, by the UE according to the measured SINRs of the HS-PDSCHs on the multiple carriers, respective Channel Quality Indicators (CQI) of the HS-PDSCHs on the multiple carriers; comparing, by the UE with a first threshold, a difference between each of the SINRs of the HS-PDSCHs on the multiple carriers and a maximal SINR of the SINRs of the HS-PDSCHs on the multiple carriers; in response to determining that a difference between the SINR of the HS-PDSCH on at least one of the multiple carriers and the maximal SINR is greater than the first threshold, updating, by the UE, the CQI of the HS-PDSCH on the at least one of the multiple carriers; and reporting, by the UE after the update, the CQIs of the HS-PDSCHs on the multiple carriers to a network side. The network side schedules the UE using the reported CQIs.

The method may further include: measuring, by the UE, Received Signal Strength Indications (RSSI) of signals received respectively on the multiple carriers; comparing, by the UE with a second threshold, a difference between each of the RSSIs corresponding respectively to the multiple carriers and a maximal RSSI of the RSSIs corresponding respectively to the multiple carriers; in response to determining that a difference between the RSSI of at least one of the multiple carriers and the maximal RSSI is greater than the second threshold, updating, by the UE, a positioning window. The positioning window may be used by the UE for filtering a signal received on a carrier.

The acquiring, by the UE according to the measured SINRs of the HS-PDSCHs on the multiple carriers, respective Channel Quality Indicators (CQI) of the HS-PDSCHs on the multiple carriers may include: acquiring, by the UE, the respective CQIs of the HS-PDSCHs on the multiple carriers by searching an SINR-CQI mapping table pre-stored in the UE for a CQI mapped to each of the measured SINRs.

The CQI of the HS-PDSCH on each of the at least one of the multiple carriers may be updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

The updating, by the UE, a positioning window may include: moving the positioning window to the left by a bit.

According to an embodiment herein, User Equipment (UE) includes a measuring module, an acquiring module, a first comparing module, a first updating module, and a reporting module.

The measuring module is configured for: measuring Signal to Interference plus Noise Ratios (SINR) of High Speed Physical Downlink Shared Channels (HS-PDSCH) on multiple carriers. The acquiring module is configured for: acquiring, according to the measured SINRs of the HS-PDSCHs on the multiple carriers, respective Channel Quality Indicators (CQI) of the HS-PDSCHs on the multiple carriers.

The first comparing module is configured for: comparing, with a first threshold, a difference between each of the SINRs of the HS-PDSCHs on the multiple carriers and a maximal SINR of the SINRs of the HS-PDSCHs on the multiple carriers.

The first updating module is configured for: when the first comparing module determines that a difference between the SINR of the HS-PDSCH on at least one of the multiple carriers and the maximal SINR is greater than the first threshold, updating the CQI of the HS-PDSCH on the at least one of the multiple carriers.

The reporting module is configured for: reporting, after the update, the CQIs of the HS-PDSCHs on the multiple carriers to a network side. The network side schedules the UE using the reported CQIs.

The UE may further include a second comparing module and a second updating module.

The measuring module may further be configured for: measuring Received Signal Strength Indications (RSSI) of signals received respectively on the multiple carriers.

The second comparing module may be configured for: comparing, with a second threshold, a difference between each of the RSSIs corresponding respectively to the multiple carriers and a maximal RSSI of the RSSIs corresponding respectively to the multiple carriers.

The second updating module may be configured for: when the second comparing module determines that a difference between the RSSI of at least one of the multiple carriers and the maximal RSSI is greater than the second threshold, updating a positioning window. The positioning window may be used by the UE for filtering a signal received on a carrier.

The UE may further include a storing module configured for storing an SINR-CQI mapping table.

The acquiring module may be configured for: acquiring the respective CQIs of the HS-PDSCHs on the multiple carriers by searching the SINR-CQI mapping table pre-stored in the storing module for a CQI mapped to each of the measured SINRs.

The CQI of the HS-PDSCH on each of the at least one of the multiple carriers may be updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

The second updating module may be configured for moving the positioning window to the left by a bit.

According to an embodiment herein, a non-transitory computer-readable storage medium stores therein a computer program for executing the method for improving network performance.

With the method for improving network performance, the UE, and the storage medium proposed herein, UE may measure Received Signal Strength Indications (RSSI) of signals received respectively on multiple carriers; the UE may compare, with a second threshold, a difference between a measured RSSI and a maximal RSSI of the measured RSSIs; when it is determined that a difference between the RSSI of at least one of the multiple carriers and the maximal RSSI is greater than the second threshold, the UE may update a positioning window; the UE may filter a carrier according to a positioning window; the UE then measures the SINRs of the HS-PDSCHs on the multiple filtered carriers; the UE acquires, according to the measured SINRs of the HS-PDSCHs on the multiple carriers, CQIs corresponding respectively to the multiple carriers; the UE compares, with a first threshold, a difference between the measured SINR of the HS-PDSCH on a carrier and a maximal SINR of the measured SINRs of the HS-PDSCHs on the multiple carriers; when it is determined that a difference between the measured SINR of the HS-PDSCH on at least one of the multiple carriers and the maximal SINR is greater than the first threshold, the UE updates the acquired CQI of the HS-PDSCH on the at least one of the multiple carriers with a greater value; the UE reports, after the update, the CQIs of the HS-PDSCHs on the multiple carriers to a network side; the network side schedules HS-PDSCH data of the UE according to the CQIs reported by the UE. In this way, by comparing, with the first threshold, the acquired CQI of the HS-PDSCH on each carrier, and updating a CQI to a greater value accordingly, a priority for scheduling the UE may be increase; and when multiple users coexist, power of HS-PDSCH data allocated by the network side may also be increased. By comparing each of the measured RSSIs with the second threshold, and updating the positioning window by moving it to a greater value accordingly, a strength of a digital baseband signal on a low-power carrier may be increased. Thus, interference among adjacent carriers may be reduced, improving performance of an AGC loop algorithm, reducing downlink HSDPA data accumulation caused by multiple retransmissions, increasing a downlink transmission rate of an HSDPA network, thereby improving user experience.

DETAILED DESCRIPTION

In an embodiment herein, UE may measure Received Signal Strength Indications (RSSI) of signals received respectively on multiple carriers; the UE may compare, with a second threshold, a difference between a measured RSSI and a maximal RSSI of the measured RSSIs. When it is determined that a difference between the RSSI of at least one of the multiple carriers and the maximal RSSI is greater than the second threshold, the UE may update a positioning window; the UE may filter a carrier according to a positioning window; the UE measures Signal to Interference plus Noise Ratios (SINR) of High Speed Physical Downlink Shared Channels (HS-PDSCH) on the multiple carriers; the UE acquires, according to the measured SINRs of the HS-PDSCHs on the multiple carriers, Channel Quality Indicators (CQI) corresponding respectively to the multiple carriers; the UE compares, with a first threshold, a difference between the measured SINR of the HS-PDSCH on a carrier and a maximal SINR of the measured SINRs of the HS-PDSCHs on the multiple carriers. When it is determined that a difference between the measured SINR of the HS-PDSCH on at least one of the multiple carriers and the maximal SINR is greater than the first threshold, the UE updates the acquired CQI of the HS-PDSCH on the at least one of the multiple carriers with a greater value; the UE reports, after the update, the CQIs of the HS-PDSCHs on the multiple carriers to a network side; the network side schedules HS-PDSCH data of the UE according to the CQIs reported by the UE.

When the UE performs dual-carrier HSDPA in a connected state, the first threshold is 3 dB. When the UE performs multicarrier HSDPA in the connected state, based on the dual-carrier value, the first threshold is increased by 0.3 dB per carrier added. The second threshold may be adjusted according to a fixed number of bits input to the UE.

Figure 1:
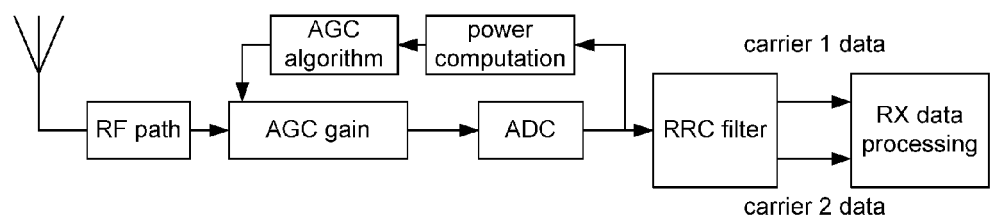
FIG. 1 is a diagram of separating, by UE, digital signals on two carriers.

To better understand a technical solution herein, introduced as follows is implementation of separating, by UE, digital signals on two carriers using a Root Raised Cosine (RRC) filtering module based on a Finite Impulse Response (FIR) structure when the UE performs, in the connected state, in-band continuous dual-carrier HSDPA. As shown in FIG. 1, a Radio-Frequency (RF) Receiving (RX) path processes a signal with a bandwidth of 10M. Both signals on a carrier 1 and a carrier 2 are filtered by an RF filtering module and an analog baseband filtering module, and then undergo analog baseband signal AGC gain adjustment, such that an analog baseband signal to enter an Analog-Digital Converter (ADC) is in a dynamic range of an RX path. When the UE separates digital signals on carrier 1 and carrier 2, a major part of ACS is implemented by an RF part, while a digital FIR-based RRC filter implements but a minor part of ACS. Thus, for continuous or in-band discontinuous multicarrier HSDPA, ACS among the carriers can be implemented only by the digital FIR-based RRC filter, reducing ACS, eventually leading to lowered downlink receiving performance of an HSDPA network.

Figure 2:
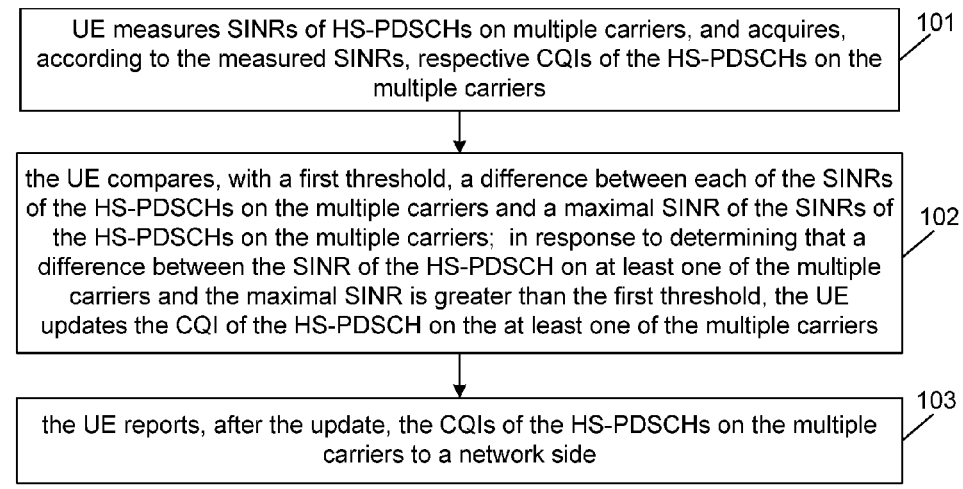
FIG. 2 is a flowchart of a method for improving network performance according to an embodiment herein.

FIG. 2 is a flowchart of a method for improving network performance according to an embodiment herein. The flow basically includes steps as follows.

In Step 101, UE measures SINRs of HS-PDSCHs on multiple carriers, and acquires, according to the measured SINRs, respective CQIs of the HS-PDSCHs on the multiple carriers.

The UE may obtain the SINR of the HS-PDSCH on each carrier by measuring a total energy of a useful signal and a total energy of interference on the each carrier and computing a ratio of the total energy of the useful signal to the total energy of the interference.

The UE may acquire the respective CQIs of the HS-PDSCHs on the multiple carriers by searching an SINR-CQI mapping table pre-stored in the UE for a CQI mapped to each of the measured SINRs.

In Step 102, the UE compares, with a first threshold, a difference between each of the SINRs of the HS-PDSCHs on the multiple carriers and a maximal SINR of the SINRs of the HS-PDSCHs on the multiple carriers; in response to determining that a difference between the SINR of the HS-PDSCH on at least one of the multiple carriers and the maximal SINR is greater than the first threshold, the UE updates the CQI of the HS-PDSCH on the at least one of the multiple carriers.

The difference between the SINR of the HS-PDSCH on a carrier and the maximal SINR may be compared with the first threshold. When the difference is greater than the first threshold, the CQI of the HS-PDSCH on the at least one of the multiple carriers may be updated.

The CQI of the HS-PDSCH on each of the at least one of the multiple carriers may be updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers. The CQI (X) of the HS-PDSCH on an Xth carrier may be updated to CQI' (X)=CQI (X)+[CQI(max)−CQI(X)]/2. The CQI (max) may be the maximal CQI of the respective CQIs of the HS-PDSCHs on the multiple carriers.

When the UE performs dual-carrier HSDPA in a connected state, the first threshold is 3 dB. When the UE performs multicarrier HSDPA in the connected state, based on the dual-carrier value, the first threshold is increased by 0.3 dB per carrier added. When the UE performs tri-carrier HSDPA in the connected state, the first threshold is 3.3 dB. When the UE performs quadri-carrier HSDPA in the connected state, the first threshold is 3.6 dB, and so on.

In Step 103, the UE reports, after the update, the CQIs of the HS-PDSCHs on the multiple carriers to a network side.

The network side schedules the UE using the reported CQIs.

The method may further include, before Step 101, steps as follows.

The UE may measure Received Signal Strength Indications (RSSI) of signals received respectively on the multiple carriers. The UE may compare, with a second threshold, a difference between each of the RSSIs corresponding respectively to the multiple carriers and a maximal RSSI of the RSSIs corresponding respectively to the multiple carriers. In response to determining that a difference between the RSSI of at least one of the multiple carriers and the maximal RSSI is greater than the second threshold. The UE may update a positioning window. The positioning window may be used by the UE for filtering a signal received on a carrier.

The positioning window may be updated by moving the positioning window to the left by a bit.

The second threshold may be adjusted according to a fixed number of bits input to the UE. For example, at the UE, a fixed number of 12 bits are output by filtering a signal received on a carrier, and a fixed number of 8 bits may be input to the UE. The second threshold may be 3 dB. Each time the fixed number of bits input to the UE is reduced by 1 bit, the second threshold may be decreased by 0.3 dB. Each time the fixed number of bits input to the UE is increased by 1 bit, the second threshold may be increased by 0.3 dB. When, at the UE, a fixed number of 12 bits are output by filtering a signal received on a carrier, and a fixed number of 7 bits are input to the UE, the second threshold may be 2.7 dB. When, at the UE, a fixed number of 12 bits are output by filtering a signal received on a carrier, and a fixed number of 9 bits are input to the UE, the second threshold may be 3.3 dB, and so on.

Figure 3:
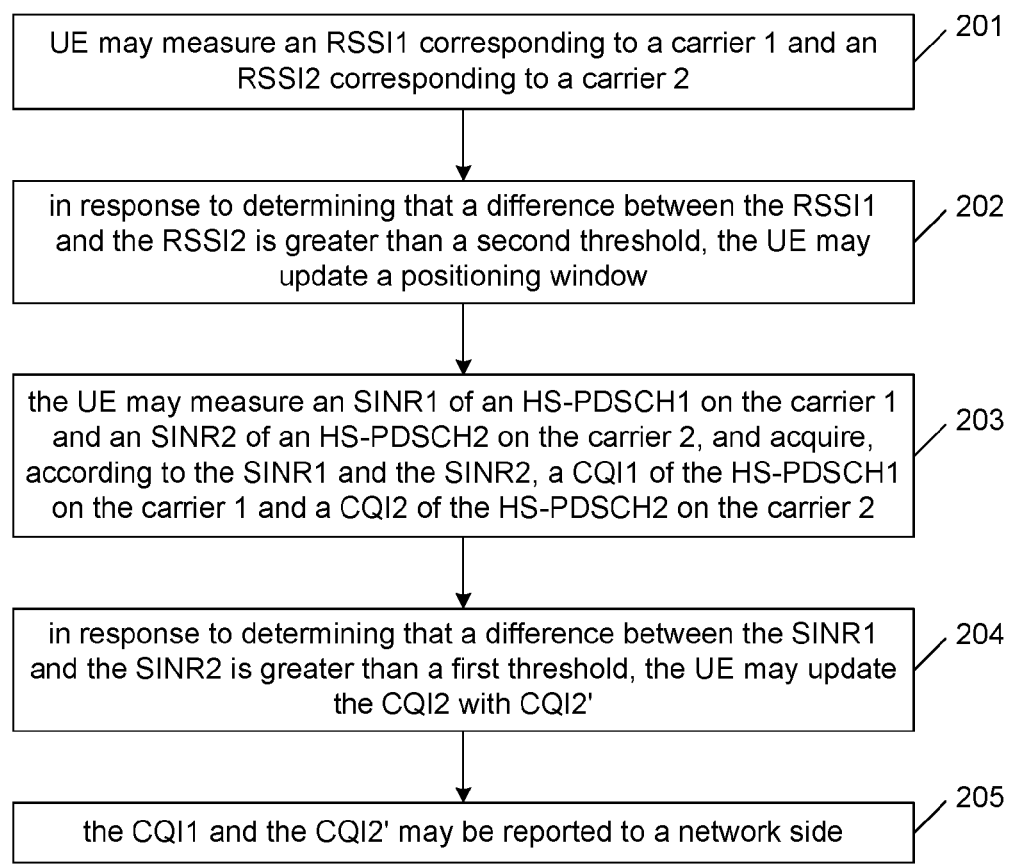
FIG. 3 is a flowchart of a method for improving network performance according to an embodiment herein.

FIG. 3 is a flowchart of a method for improving network performance according to an embodiment herein, where the UE performs HSDPA on two carriers. The detailed flow may include steps as follows.

In Step 201, UE may measure an RSSI1 corresponding to a carrier 1 and an RSSI2 corresponding to a carrier 2.

The RSSI1 of the carrier 1 and the RSSI2 of the carrier 2 may be measured. The RSSI1 may be greater than the RSSI2.

The UE may measure the RSSI of a carrier using related art, which is not repeated herein.

In Step 202, in response to determining that a difference between the RSSI1 and the RSSI2 is greater than a second threshold, the UE may update a positioning window.

The positioning window may be used by the UE for filtering a signal received on a carrier.

The positioning window may be updated by moving the positioning window to the left by a bit.

The second threshold may be adjusted according to a fixed number of bits input to the UE. For example, at the UE, a fixed number of 12 bits are output by filtering a signal received on a carrier, and a fixed number of 8 bits may be input to the UE. The second threshold may be 3 dB. Each time the fixed number of bits input to the UE is reduced by 1 bit, the second threshold may be decreased by 0.3 dB. Each time the fixed number of bits input to the UE is increased by 1 bit, the second threshold may be increased by 0.3 dB. When, at the UE, a fixed number of 12 bits are output by filtering a signal received on a carrier, and a fixed number of 7 bits are input to the UE, the second threshold may be 2.7 dB. When, at the UE, a fixed number of 12 bits are output by filtering a signal received on a carrier, and a fixed number of 9 bits are input to the UE, the second threshold may be 3.3 dB, and so on.

In Step 203, the UE may measure an SINR1 of an HS-PDSCH1 on the carrier 1 and an SINR2 of an HS-PDSCH2 on the carrier 2, and acquire, according to the SINR1 and the SINR2, a CQI1 of the HS-PDSCH1 on the carrier 1 and a CQI2 of the HS-PDSCH2 on the carrier 2.

The UE may obtain the SINR of the HS-PDSCH on each carrier by measuring a total energy of a useful signal and a total energy of interference on the each carrier and computing a ratio of the total energy of the useful signal to the total energy of the interference. The SINR1 may be greater than the SINR2.

The UE may search an SINR-CQI mapping table pre-stored in the UE for the CQI1 mapped to the SINR1 and the CQI2 mapped to the SINR2.

In Step 204, in response to determining that a difference between the SINR1 and the SINR2 is greater than a first threshold, the UE may update the CQI2 with CQI2'.

The CQI2 may be updated to $CQI2'=CQI2+(CQI1-CQI2)/2$;

When the UE performs dual-carrier HSDPA in a connected state, the first threshold is 3 dB. When the UE performs multicarrier HSDPA in the connected state, based on the dual-carrier value, the first threshold is increased by 0.3 dB per carrier added. When the UE performs tri-carrier HSDPA in the connected state, the first threshold is 3.3 dB. When the UE performs quadri-carrier HSDPA in the connected state, the first threshold is 3.6 dB, and so on.

In Step 205, the CQI1 and the CQI2' may be reported to a network side.

The CQI1 and the CQI2' may each be used for the network side to schedule the UE on the carrier 1 and the carrier 2.

Figure 4:
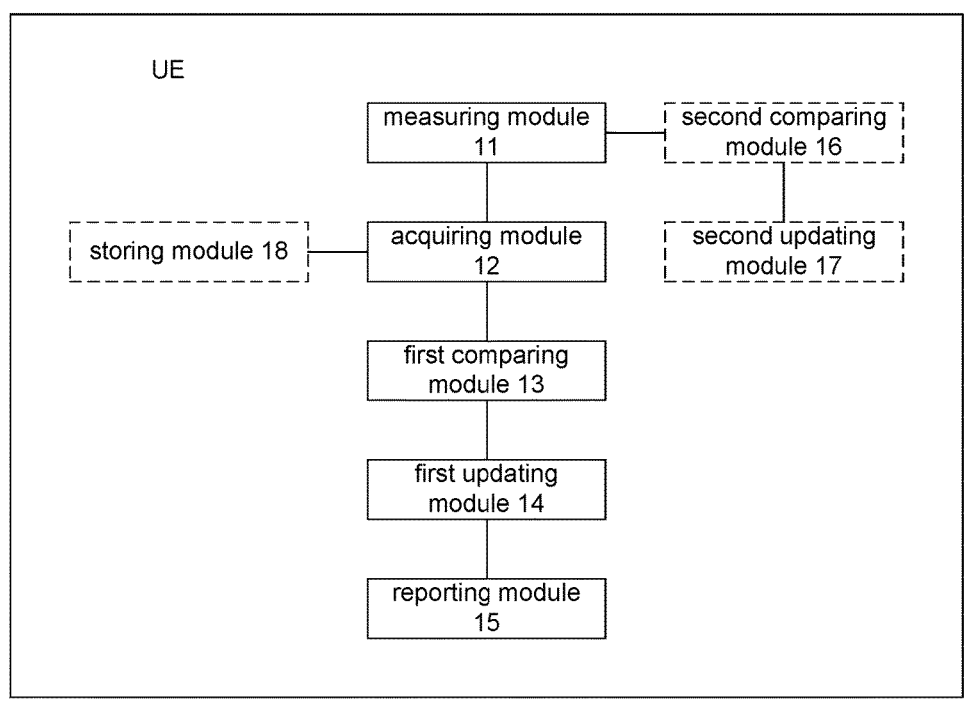
FIG. 4 is a diagram of a structure of UE according to an embodiment herein.

For implementing an aforementioned method for improving network performance, an embodiment herein also provides UE. As shown in FIG. 4, the UE includes a measuring module 11, an acquiring module 12, a first comparing module 13, a first updating module 14, and a reporting module 15.

The measuring module 11 is configured for: measuring Signal to Interference plus Noise Ratios (SINR) of High Speed Physical Downlink Shared Channels (HS-PDSCH) on multiple carriers.

The acquiring module 12 is configured for: acquiring, according to the SINRs of the HS-PDSCHs on the multiple carriers measured by the measuring module 11, respective Channel Quality Indicators (CQI) of the HS-PDSCHs on the multiple carriers.

The first comparing module 13 is configured for: comparing, with a first threshold, a difference between each of the SINRs of the HS-PDSCHs on the multiple carriers and a maximal SINR of the SINRs of the HS-PDSCHs on the multiple carriers.

When the UE performs dual-carrier HSDPA in a connected state, the first threshold is 3 dB. When the UE performs multicarrier HSDPA in the connected state, based on the dual-carrier value, the first threshold is increased by 0.3 dB per carrier added. When the UE performs tri-carrier HSDPA in the connected state, the first threshold is 3.3 dB. When the UE performs quadri-carrier HSDPA in the connected state, the first threshold is 3.6 dB, and so on.

The first updating module 14 is configured for: in response to determining, by the first comparing module, that a difference between the SINR of the HS-PDSCH on at least one of the multiple carriers and the maximal SINR is greater than the first threshold, updating the CQI of the HS-PDSCH on the at least one of the multiple carriers.

The CQI of the HS-PDSCH on each of the at least one of the multiple carriers may be updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers. The CQI (X) of the HS-PDSCH on an Xth carrier may be updated to $CQI'(X)=CQI(X)+[CQI(max)-CQI(X)]/2$. The CQI (max) may be the maximal CQI of the respective CQIs of the HS-PDSCHs on the multiple carriers.

The reporting module 15 is configured for: reporting, after the update, the CQIs of the HS-PDSCHs on the multiple carriers to a network side. The network side schedules the UE using the reported CQIs.

The UE may further include a second comparing module 16 and a second updating module 17.

The measuring module 11 may be further configured for: measuring Received Signal Strength Indications (RSSI) of signals received respectively on the multiple carriers.

The second comparing module 16 may be configured for: comparing, with a second threshold, a difference between each of the RSSIs corresponding respectively to the multiple carriers and a maximal RSSI of the RSSIs corresponding respectively to the multiple carriers.

The second threshold may be adjusted according to a fixed number of bits input to the UE. For example, at the UE, a fixed number of 12 bits are output by filtering a signal received on a carrier, and a fixed number of 8 bits may be input to the UE. The second threshold may be 3 dB. Each time the fixed number of bits input to the UE is reduced by 1 bit, the second threshold may be decreased by 0.3 dB. Each time the fixed number of bits input by a signal receiver is increased by 1 bit, the second threshold may be increased by 0.3 dB. When, at the UE, a fixed number of 12 bits are output by filtering a signal received on a carrier, and a fixed number of 7 bits are input to the UE, the second threshold may be 2.7 dB. When, at the UE, a fixed number of 12 bits are output by filtering a signal received on a carrier, and a fixed number of 9 bits are input to the UE, the second threshold may be 3.3 dB, and so on.

The second updating module 17 may be configured for: in response to determining, by the second comparing module, that a difference between the RSSI of at least one of the multiple carriers and the maximal RSSI is greater than the second threshold, updating a positioning window. The positioning window may be used by the UE for filtering a signal received on a carrier.

The UE may further include a storing module 18 configured for storing an SINR-CQI mapping table.

The acquiring module 12 may be configured for: acquiring the respective CQIs of the HS-PDSCHs on the multiple carriers by searching the SINR-CQI mapping table pre-stored in the storing module 18 for a CQI mapped to each of the measured SINRs.

The second updating module may be configured for moving the positioning window to the left by a bit.

The storing module 18 in the UE proposed herein may be implemented via storing equipment such as a hard disk. The measuring module 11, the acquiring module 12, the first comparing module 13, the first updating module 14, the reporting module 15, the second comparing module 16, and the second updating module 17 may all be implemented via at least one hardware processor or specific logical circuits. The at least one hardware processor may be a Central Processing Unit (CPU), a Micro Processing Unit (MPU), a Digital Signal Processor (DSP), or a Field Programmable Gate Array (FPGA), etc.

When being implemented as a software functional module and sold or used as an independent product, a method herein may be also stored in a transitory or non-transitory computer-readable storage medium. Based on such understanding, the essence of the technical solution of the embodiments herein, or the part contributing to the prior art may be embodied in form of a software product. The computer software product may be stored in a storage medium, including a number of instructions allowing a computer device (which may be a personal computer, a server, or a network device, etc.) to execute all or part of the method in embodiments of the present disclosure. The storage medium includes various media capable of storing program codes, such as a U disk, a mobile hard disk, a Read-Only Memory (ROM), a magnetic disk, a CD, and the like. Thus, an embodiment herein is not limited to any specific combination of hardware and software.

An embodiment herein also provides a non-transitory computer-readable storage medium, storing therein a computer program for executing a method for improving network performance herein.

Note that a method and device for improving network performance, and a storage medium herein apply to HSDPA.

What described are merely embodiments herein and are not intended to limit the scope of protection of the present disclosure.

The invention claimed is:

1. A method for improving network performance, comprising:
  measuring, by User Equipment (UE), Signal to Interference plus Noise Ratios (SINR) of High Speed Physical Downlink Shared Channels (HS-PDSCH) on multiple carriers;
  acquiring, by the UE according to the measured SINRs of the HS-PDSCHs on the multiple carriers, respective Channel Quality Indicators (CQI) of the HS-PDSCHs on the multiple carriers;
  comparing, by the UE with a first threshold, a difference between each of the SINRs of the HS-PDSCHs on the multiple carriers and a maximal SINR of the SINRs of the HS-PDSCHs on the multiple carriers;
  in response to determining that a difference between the SINR of the HS-PDSCH on at least one of the multiple carriers and the maximal SINR is greater than the first threshold, updating, by the UE, the CQI of the HS-PDSCH on the at least one of the multiple carriers; and
  reporting, by the UE after the update, the CQIs of the HS-PDSCHs on the multiple carriers to a network side, such that the network side schedules the UE using the reported CQIs.

2. The method according to claim 1, further comprising: before the acquiring, by the UE, the respective CQIs of the HS-PDSCHs on the multiple carriers,
  measuring, by the UE, Received Signal Strength Indications (RSSI) of signals received respectively on the multiple carriers;
  comparing, by the UE with a second threshold, a difference between each of the RSSIs corresponding respectively to the multiple carriers and a maximal RSSI of the RSSIs corresponding respectively to the multiple carriers;
  in response to determining that a difference between the RSSI of at least one of the multiple carriers and the maximal RSSI is greater than the second threshold, updating, by the UE, a positioning window, the positioning window being used by the UE for filtering a signal received on a carrier.

3. The method according to claim 1, wherein the acquiring, by the UE according to the measured SINRs of the HS-PDSCHs on the multiple carriers, respective Channel Quality Indicators (CQI) of the HS-PDSCHs on the multiple carriers comprises:
  acquiring, by the UE, the respective CQIs of the HS-PDSCHs on the multiple carriers by searching an SINR-CQI mapping table pre-stored in the UE for a CQI mapped to each of the measured SINRs.

4. The method according to claim 1, wherein the CQI of the HS-PDSCH on each of the at least one of the multiple carriers is updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

5. The method according to claim 2, wherein the updating, by the UE, a positioning window comprises:
  moving the positioning window to the left by a bit.

6. The method according to claim 2, wherein the acquiring, by the UE according to the measured SINRs of the HS-PDSCHs on the multiple carriers, respective Channel Quality Indicators (CQI) of the HS-PDSCHs on the multiple carriers comprises:
acquiring, by the UE, the respective CQIs of the HS-PDSCHs on the multiple carriers by searching an SINR-CQI mapping table pre-stored in the UE for a CQI mapped to each of the measured SINRs.

7. The method according to claim 2, wherein the CQI of the HS-PDSCH on each of the at least one of the multiple carriers is updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

8. User Equipment (UE), comprising: a measuring module, an acquiring module, a first comparing module, a first updating module, and a reporting module,
wherein the measuring module is configured for: measuring Signal to Interference plus Noise Ratios (SINR) of High Speed Physical Downlink Shared Channels (HS-PDSCH) on multiple carriers,
wherein the acquiring module is configured for: acquiring, according to the measured SINRs of the HS-PDSCHs on the multiple carriers, respective Channel Quality Indicators (CQI) of the HS-PDSCHs on the multiple carriers,
wherein the first comparing module is configured for: comparing, with a first threshold, a difference between each of the SINRs of the HS-PDSCHs on the multiple carriers and a maximal SINR of the SINRs of the HS-PDSCHs on the multiple carriers,
wherein the first updating module is configured for: in response to determining that a difference between the SINR of the HS-PDSCH on at least one of the multiple carriers and the maximal SINR is greater than the first threshold, updating the CQI of the HS-PDSCH on the at least one of the multiple carriers,
wherein the reporting module is configured for: reporting, after the update, the CQIs of the HS-PDSCHs on the multiple carriers to a network side, such that the network side schedules the UE using the reported CQIs.

9. The UE according to claim 8, further comprising a second comparing module and a second updating module,
wherein the measuring module is further configured for: measuring Received Signal Strength Indications (RSSI) of signals received respectively on the multiple carriers,
wherein the second comparing module is configured for: comparing, with a second threshold, a difference between each of the RSSIs corresponding respectively to the multiple carriers and a maximal RSSI of the RSSIs corresponding respectively to the multiple carriers,
wherein the second updating module is configured for: in response to determining that a difference between the RSSI of at least one of the multiple carriers and the maximal RSSI is greater than the second threshold, updating a positioning window, the positioning window being used by the UE for filtering a signal received on a carrier.

10. The UE according to claim 8, further comprising a storing module configured for storing an SINR-CQI mapping table,
wherein the acquiring module is configured for: acquiring the respective CQIs of the HS-PDSCHs on the multiple carriers by searching the SINR-CQI mapping table for a CQI mapped to each of the measured SINRs.

11. The UE according to claim 8, wherein the CQI of the HS-PDSCH on each of the at least one of the multiple carriers is updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

12. The UE according to claim 9, wherein the second updating module is configured for moving the positioning window to the left by a bit.

13. The UE according to claim 9, further comprising a storing module configured for storing an SINR-CQI mapping table,
wherein the acquiring module is configured for: acquiring the respective CQIs of the HS-PDSCHs on the multiple carriers by searching the SINR-CQI mapping table for a CQI mapped to each of the measured SINRs.

14. The UE according to claim 9, wherein the CQI of the HS-PDSCH on each of the at least one of the multiple carriers is updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

15. A non-transitory computer-readable storage medium, storing therein computer executable instructions for executing a method for improving network performance, the method comprising:
measuring, by User Equipment (UE), Signal to Interference plus Noise Ratios (SINR) of High Speed Physical Downlink Shared Channels (HS-PDSCH) on multiple carriers;
acquiring, by the UE according to the measured SINRs of the HS-PDSCHs on the multiple carriers, respective Channel Quality Indicators (CQI) of the HS-PDSCHs on the multiple carriers;
comparing, by the UE with a first threshold, a difference between each of the SINRs of the HS-PDSCHs on the multiple carriers and a maximal SINR of the SINRs of the HS-PDSCHs on the multiple carriers;
in response to determining that a difference between the SINR of the HS-PDSCH on at least one of the multiple carriers and the maximal SINR is greater than the first threshold, updating, by the UE, the CQI of the HS-PDSCH on the at least one of the multiple carriers; and
reporting, by the UE after the update, the CQIs of the HS-PDSCHs on the multiple carriers to a network side, such that the network side schedules the UE using the reported CQIs.

16. The storage medium according to claim 15, wherein the method further comprises: before the acquiring, by the UE, the respective CQIs of the HS-PDSCHs on the multiple carriers,
measuring, by the UE, Received Signal Strength Indications (RSSI) of signals received respectively on the multiple carriers;
comparing, by the UE with a second threshold, a difference between each of the RSSIs corresponding respectively to the multiple carriers and a maximal RSSI of the RSSIs corresponding respectively to the multiple carriers;

in response to determining that a difference between the RSSI of at least one of the multiple carriers and the maximal RSSI is greater than the second threshold, updating, by the UE, a positioning window, the positioning window being used by the UE for filtering a signal received on a carrier.

17. The storage medium according to claim 15, wherein the acquiring, by the UE according to the measured SINRs of the HS-PDSCHs on the multiple carriers, respective Channel Quality Indicators (CQI) of the HS-PDSCHs on the multiple carriers comprises:
   acquiring, by the UE, the respective CQIs of the HS-PDSCHs on the multiple carriers by searching an SINR-CQI mapping table pre-stored in the UE for a CQI mapped to each of the measured SINRs.

18. The storage medium according to claim 15, wherein the CQI of the HS-PDSCH on each of the at least one of the multiple carriers is updated by adding half a difference between the CQI of the HS-PDSCH on the each of the at least one of the multiple carriers and a maximal CQI of the respective CQIs of the HS-PDSCHs on the multiple carriers to the CQI of the HS-PDSCH on the each of the at least one of the multiple carriers.

19. The storage medium according to claim 16, wherein the updating, by the UE, a positioning window comprises:
   moving the positioning window to the left by a bit.

* * * * *